(12) United States Patent
Kesavan et al.

(10) Patent No.: US 8,140,089 B2
(45) Date of Patent: Mar. 20, 2012

(54) NETWORK SELECTION FOR MULTIPLE NETWORK PLATFORMS

(75) Inventors: Vijay Sarathi Kesavan, Hillsboro, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 12/123,354

(22) Filed: May 19, 2008

(65) Prior Publication Data
US 2009/0286525 A1   Nov. 19, 2009

(51) Int. Cl.
*H04W 72/00* (2009.01)

(52) U.S. Cl. .................. 455/452.2; 455/428; 455/432.1; 455/436; 455/437; 455/455; 370/331; 370/332; 370/334

(58) Field of Classification Search .......... 455/428–429, 455/432.1–453
See application file for complete search history.

(56) References Cited

U.S. PATENT DOCUMENTS

| | | | | |
|---|---|---|---|---|
| 6,771,621 B1 * | 8/2004 | Lee | ................................ | 370/331 |
| 2002/0176382 A1 * | 11/2002 | Madour et al. | ................. | 370/331 |
| 2004/0023669 A1 * | 2/2004 | Reddy | ......................... | 455/456.1 |
| 2004/0109425 A1 * | 6/2004 | Scribano et al. | ............... | 370/331 |
| 2005/0096051 A1 * | 5/2005 | Lee et al. | ....................... | 455/438 |
| 2006/0258285 A1 * | 11/2006 | Riddles | ......................... | 455/41.2 |
| 2007/0136412 A1 * | 6/2007 | Oba et al. | ....................... | 709/200 |

OTHER PUBLICATIONS

"IEEE Standard for Local and metropolitan area networks—Media Independent Handover Services," Sponsor LAN/MAN Standards Committee of the IEEE Computer Society, Approved Nov. 11, 2008, IEEE-SA Standards Board, 320 pages.
Vivek Gupta et al. "IEEE P802.21 Tutorial," Presented at IEEE 802.21 session #15 in San Diego, CA, Jul. 17, 2006, 65 pages.

* cited by examiner

*Primary Examiner* — Dai A Phuong
(74) *Attorney, Agent, or Firm* — Schwabe, Williamson & Wyatt, P.C.

(57) ABSTRACT

Embodiments provide methods, systems, and apparatuses to generate and send a command message to a mobile device connected to a first wireless network to command the mobile device to connect to one of one or more candidate wireless networks. The message includes embedded service flow context information of the candidate networks including one or more attributes of the candidate wireless networks that are of potential interest to the mobile device in determining a performance or security impact if the mobile device switches to the one or more wireless networks. The mobile device can conditionally refuse the command if the candidate wireless networks are unable to meet one or more service level requirements of the apparatus. Other embodiments are disclosed and described.

13 Claims, 4 Drawing Sheets

US 8,140,089 B2

NETWORK SELECTION FOR MULTIPLE NETWORK PLATFORMS

TECHNICAL FIELD

Embodiments of the present disclosure relate to the field of mobile communications. In particular to improved network selection for multiple network platforms including providing service flow context information in network connection command messages and providing the ability to refuse the command if the service flow context information does not meet the service needs of a mobile device.

BACKGROUND

Handoffs between heterogeneous networks are possible using any of a number of proprietary or non-proprietary standards and/or protocols. In some instances, the network provider may command a mobile device to switch from one network to another. Once the mobile device switches to the new network, the mobile device can query the new network to obtain information regarding the new network. If the network can not meet certain service level requirements of the mobile device, the mobile device must switch to a new network—possibly the previously-connected network—that meets its service level requirements.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF EMBODIMENTS

Figure 1:
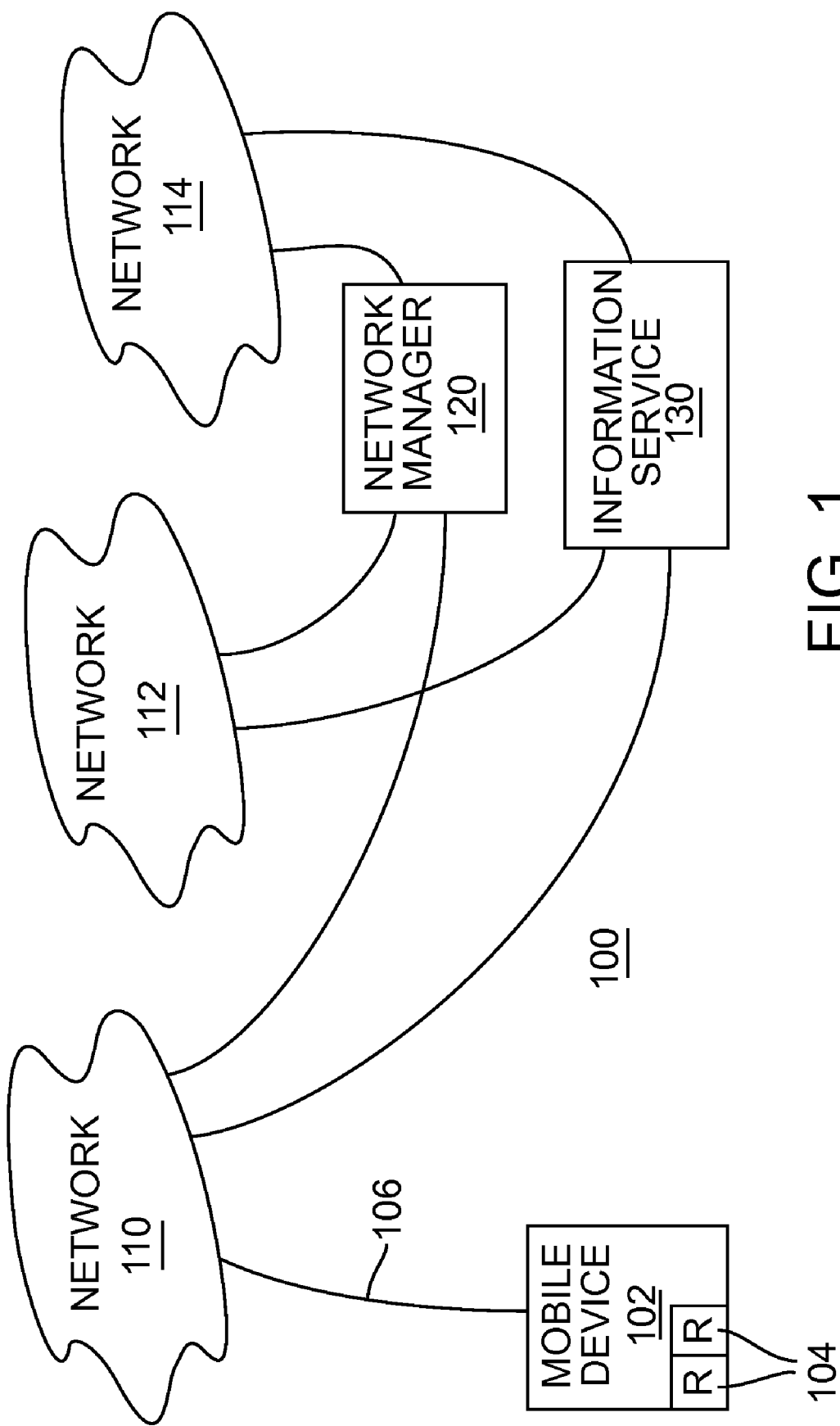
FIG. 1 illustrates a network overview of a network for an improved wireless network selection in multiple network platforms in accordance with various embodiments.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

The description may use perspective-based descriptions such as up/down, back/front, and top/bottom. Such descriptions are merely used to facilitate the discussion and are not intended to restrict the application of embodiments of the present disclosure.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other. As used throughout this specification, a device that is wirelessly connected may be a device that is connected via a wireless medium to one or more wireless access points using one of various mobile network or wireless network protocols. Such terminology does not imply that the wireless device is directly or physically in contact with the wireless network.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments, are synonymous.

In various embodiments, methods, apparatuses, and systems for an improved network selection in multiple network platforms are provided. In exemplary embodiments, a computing system may be endowed with one or more components of the disclosed apparatuses and/or systems and may be employed to perform one or more methods as disclosed herein.

The upcoming Institute of Electrical and Electronics Engineers (IEEE) 802.21 standard describes Media Independent Handover (MIH) Services that enable mobile devices to switch between heterogeneous wireless networks. (See e.g. IEEE P802.21 Tutorial, presented Jul. 21, 2006 for further information). Examples of heterogeneous wireless networks include IEEE 802.11, 802.16, and various cellular networks among many others. (See e.g. IEEE Std. 802.11, published Jun. 12, 2007; IEEE Std. 802.16 published Oct. 1, 2004 for further information.) Among other things, 802.21 provides for an information service and a command service. The information service allows the mobile device to discover neighboring networks and their static characteristics through the connected network. The command service allows the network and mobile device to negotiate handover; for example a network manager device can command mobile devices to switch networks. In some instances, however, the mobile device may have one or more specific service level requirements (or needs) that must be met. These service level requirements may be application-specific, related to network security requirements of either the mobile device or an application executing on the mobile device, or may be some other service level requirements. When the network manager commands the mobile device to switch to a network, the mobile device can—according to the upcoming IEEE 802.21 standard—query the information service to obtain information regarding the new network before switching to the new network. The mobile device can evaluate the information obtained from the information service and determine if the new network meets some or all of its service level requirements and inform the network manager if the new network is unsuitable.

Embodiments of the present disclosure may include generating command service messages (or similar in a non-802.21 network) that command a mobile node to switch to one of a list of candidate networks, the message including embedded network information for one or more of the candidate networks from the information service (or similar). The mobile devices may determine based on the embedded information whether to make the connection to any of the candidate networks, and to which candidate network it should connect to, without having to send separate inquiry messages to the information service to obtain the information about each candidate network. In embodiments, this may save bandwidth, increase spectrum efficiency, reduce power consumption, and/or improve service continuity over the process required by the IEEE 802.21 standard and other known methods of heterogeneous network hand-off.

As used throughout the specification, claims, and abstract, "service flow context information" may be one or more attributes of a wireless network that may impact application performance or application, data, or mobile device security. Examples include security information, quality of service (QOS), total bandwidth, available bandwidth, available data throughput, network delay information, and network jitter, among others. Also, the service flow context information may include basic information such as network type, channel number, and other connection-specific information.

FIG. 1 illustrates a network overview of a wireless network 100 for an improved network selection in a multiple network platform in accordance with various embodiments. Mobile device 102 may include one or more radios 104 configured to communicate with any of service provider wireless networks 110-114. In embodiments, wireless networks 110-114 may be heterogeneous networks; in embodiments they may be the same type of network; in embodiments two may be the same type while the other is heterogeneous. In embodiments, there may be more or fewer than three wireless networks within network 100. The depiction of three networks in FIG. 1 is for illustrative purposes only and should not be construed to limit the scope of embodiments.

Wireless networks 110-114 may also be communicatively coupled to network manager 120 and information service 130. In an exemplary embodiment, mobile device 102 may form wireless connection 106 via one of radios 104 to network 110. Network manager 120 may, in embodiments, be configured to determine that mobile device 102 should switch to connect to a different network and to generate and send a command message to mobile device 102, to form a new connection to one of network 112 or 114. The command message may contain embedded service flow context information regarding the one of network 112 or 114.

In embodiments, network manager 120 may be configured to determine whether mobile device 102 is to be instructed to switch to connect to a second wireless network, to integrally instruct the mobile device to switch to connect to the second wireless network, and to provide the mobile device with attributes of the second wireless network to enable the mobile device to determine whether to refuse or accept the command on receipt of the command. Determination whether mobile device 102 is to be instructed to switch to connect to a second wireless network may be performed in any known application-dependent manner, including but not limited, to metrics collected and/or received on the performance of the first network.

In embodiments, network manager 120 may be configured to obtain service flow context information from information service 130. The mobile device may, in embodiments, be configured to determine whether the service flow context information indicates that the new network is able to meet one or more service level requirements of mobile device 102. If not, mobile device 102 may send a refusal message back to network manager 120. In embodiments, mobile device 102 and network manager 120 may then negotiate a connection to an alternative network to meet one or more service level requirements of mobile device 102. In embodiments, network manager 120 may be comprised within a base station.

Figure 2:
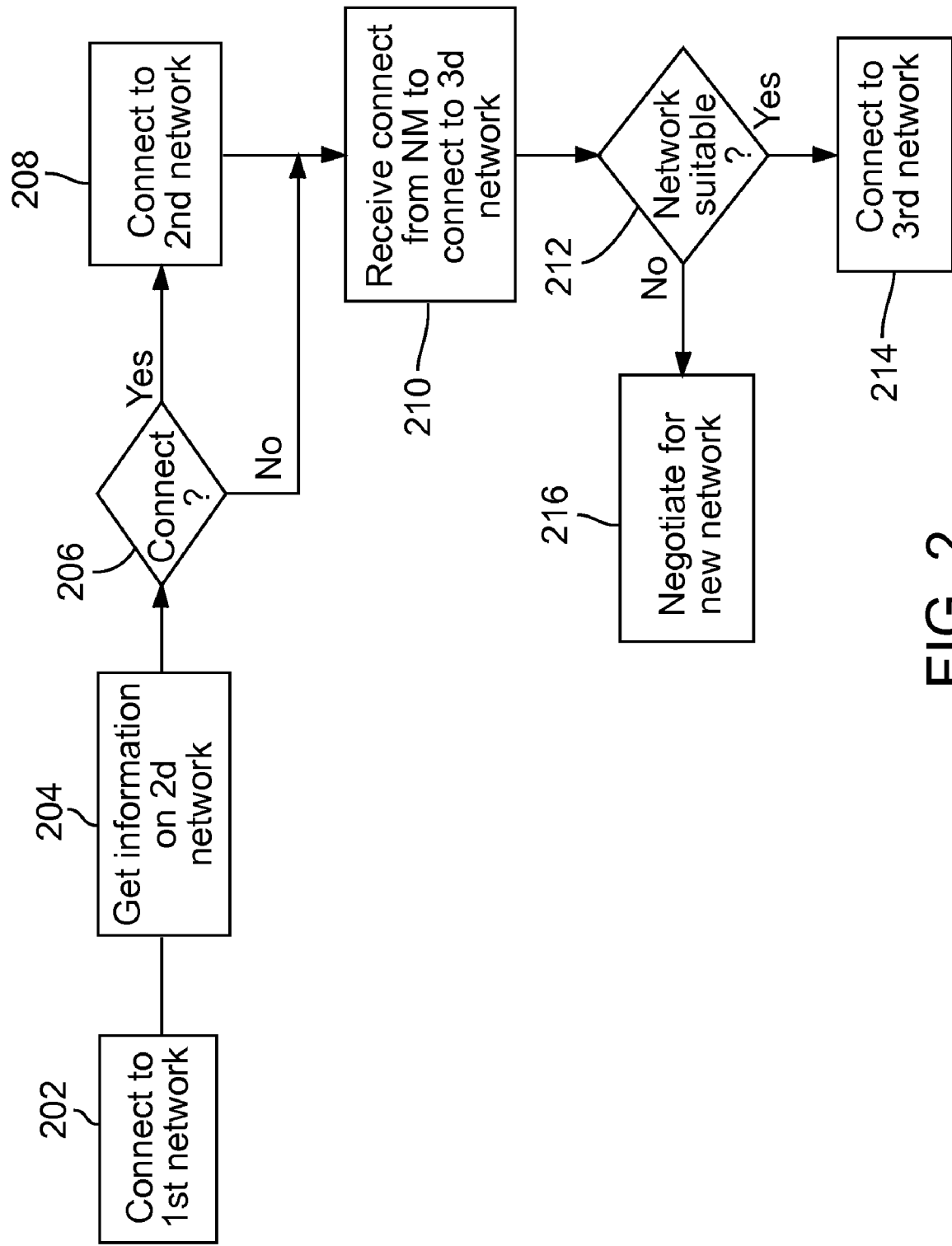
FIG. 2 illustrates a flow chart of a mobile device determining, based on received service flow context information, whether to switch to a different wireless network in response to a received command in accordance with various embodiments.

FIG. 2 illustrates a flow chart of a mobile device—such as for example mobile device 102 of FIG. 1—determining, based on received service flow context information, whether to change networks in accordance with various embodiments. The mobile device may initially connect to a first network—such as for example network 110 of FIG. 1—block 202. The mobile device may, on its own initiative, obtain service flow context information about a second network, block 204 and determine, based on the service flow context information, whether to connect to the second network decision, block 206. If the service flow context information indicates that the second network will meet one or more service level requirements of the mobile device, then it may connect to the second network, block 208. If not, it may remain on the first network.

The mobile device may receive a command message from a network manager, such as for example network manager 120 of FIG. 1, commanding the mobile device to switch to connect to a third network, block 210. The command message may, in embodiments, include service flow context information regarding the third network. The mobile device may determine, based on the embedded service flow context information, whether the third network meets one or more service level requirements of the mobile device decision, block 212. If it does, the mobile device may connect to the third network, block 214. If it does not, the mobile device may negotiate with the network manager to determine a more suitable network, such as for example one that meets the mobile device's service level requirements, block 216. In embodiments, the command message may include an ordered list of one or more candidate networks, and the mobile device may select from amongst those candidate networks based on the service flow context information provided in the command message. A mobile node may also determine that none of the candidate networks meet its requirements and negotiate to determine a more suitable network. In embodiments, the command message may include service flow context information for only some of the candidate networks.

Embodiments may provide improvements over prior-known methods for performing hand-offs between disparate wireless networks. By embedding service flow context information into the command message, the mobile device may be able to determine whether any of the candidate networks meet its service level requirements without first having to either connect to any of the new networks and/or send a query message to an information service to ascertain the service flow context information of the candidate networks. By reducing the number of messages required to be transmitted and received by the mobile device, and/or eliminating the need to connect to any of the candidate networks before receiving service flow context information, embodiments may eliminate additional messages and may thereby utilize less bandwidth than previously-known methods, use the frequency spectrum more efficiently than known methods, reduce power usage by the mobile device (possibly resulting in longer battery life), and/or provide for improved service continuity and/or security.

In regards to improved service continuity, real-time interactive applications such as Voice over Internet Protocol (VoIP), instant messaging, and other applications may require network resources that meet certain service level requirements. Thus, in embodiments, the service level requirements may be application-specific.

Figure 3:
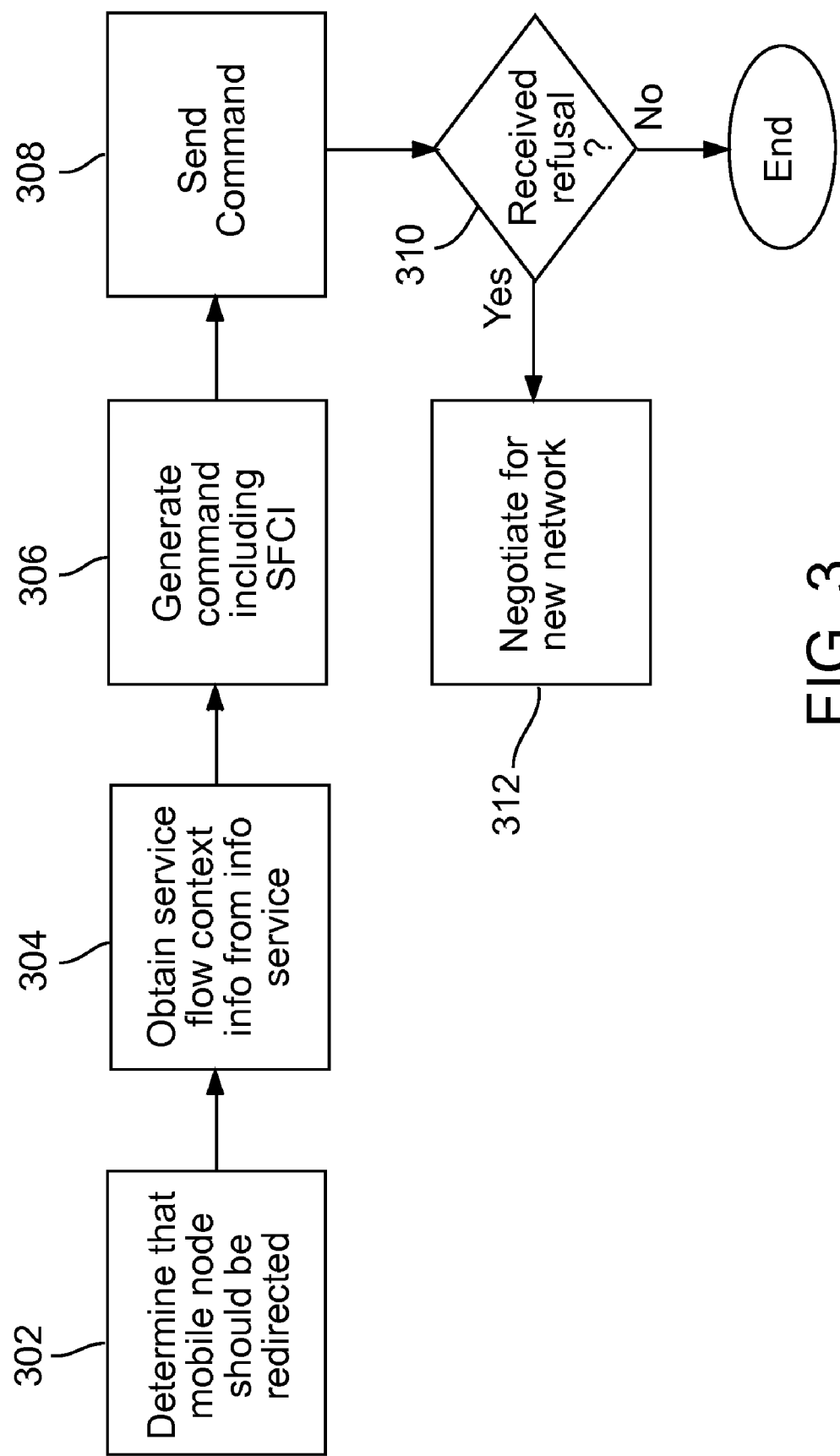
FIG. 3 illustrates a flow chart of a network manager providing embedded service flow context information in a command message in accordance with various embodiments.

FIG. 3 illustrates a flow chart of a network manager embedding service flow context information in a command message in accordance with various embodiments. A network manager device, such as for example network manager 120 of FIG. 1, may determine that a mobile node, such as for example mobile node 102 of FIG. 1, should be redirected from a first network to a second network, block 302. This determination may be made, in embodiments, based on various requirements as established by the network provider such as time-of-day, network utilization, or other requirements. In alternative embodiments, the network manager may determine an ordered list of candidate networks from which the mobile node may select. The network manager may obtain service flow context information regarding the second network from an information service, block 304. In alternative embodiments, the network manager may obtain the service flow context information prior to determining that the mobile node should switch to the second network. In embodiments, the network manager may obtain service flow context information from the information service at periodic intervals. In embodiments, the network manager may retrieve the service flow context information from the information service in real time upon determining that the mobile device should be instructed to switch to connect to the second network. In alternative embodiments, the network manager may obtain service flow context information for an ordered list of one or more candidate networks.

The network manager may then generate a command message to the mobile node commanding the mobile node to switch to the second network, block 306. The command message may contain embedded service flow context information regarding the second network. The embedded service flow context information may include one or more attributes of the second wireless network that are of potential interest to the mobile device in determining a performance or security impact if the mobile device switches to the second wireless network. The network manager may then send the generated command message, block 308. In alternative embodiments, the network manager may embed service flow context information for one or more candidate networks into the command message. The network manager may then determine whether the mobile device has sent a refusal message to the network manager, block 310. In embodiments, this refusal message may be sent by the mobile device after a determination that the embedded service flow context information indicates that the second network will not meet one or more service level requirements of the mobile device. In alternative embodiments, the refusal message may be sent after a determination that none of one or more candidate networks meets one or more service level requirements of the mobile device. If the network manager receives a refusal, it may then negotiate with the mobile device to obtain a more suitable network, block 312.

Again, by embedding the service flow context information into the command message, embodiments may eliminate unnecessary wireless messages such as messages from the mobile device to the information service to query for the service flow context information of the second network or any of one or more candidate networks. In embodiments, this may improve spectrum efficiency, energy usage, etc, as described elsewhere within this specification.

Figure 4:
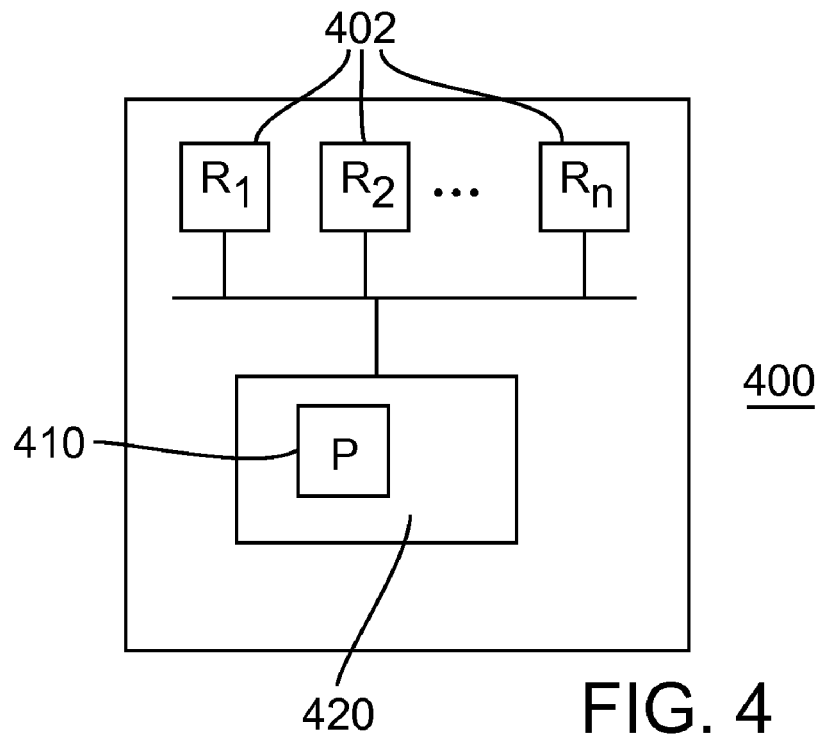
FIG. 4 illustrates a mobile device suitable for practicing various embodiments.

FIG. 4 illustrates a mobile device 400 in accordance with various embodiments. Mobile device 400 may include one or more radios 402. In embodiments, some or all of radios 402 may be configured to facilitate wireless connections to one or more wireless network types. In embodiments, radios 402 may be configured to transmit and receive modulated wireless signals. In embodiments, mobile device 400 may include only one radio, capable of communicating with multiple network types, such as for example wireless networks utilizing any of the IEEE 802.11, IEEE 802.16, or any of various cellular network types, among others. One or more radios 402 may be configured to allow mobile device 400 to connect to a plurality of network types and topologies. In embodiments, mobile device 400 may be a computing device (including a desktop computer or server), a personal digital assistant, a mobile phone, a game player, a laptop computer, a media player, ultra mobile portable computer (UMPC), Mobile Internet Device (MID), or other device.

Mobile device 400 may include one or more processors 410 configured to receive, from a network manager system via one of radios 402, through a first wireless network of a plurality of wireless networks, a command message commanding mobile device 400 to connect to a second wireless network or one of one or more candidate wireless networks. As described elsewhere in this specification, the command message may include service flow context information of the second wireless network or of the one or more candidate wireless networks. The processor may also be configured to determine, based on the received service flow context information, whether the second wireless network—or any of the one or more candidate wireless networks—is able to meet one or more service level requirements of the mobile device. Also, it may be configured to conditionally send a refusal message to the network manager system via one of radios 402 refusing to connect to the second wireless network if the second wireless network—or all of the candidate networks—is determined to be unable to meet the one or more service level requirements. In embodiments, processor 410 may be included within chipset 420.

In embodiments, processor 410 may be configured to connect, via one of radios 402, to the second network if it is determined that the second wireless network—or any of the candidate networks—is capable of meeting the one or more service level requirements. In embodiments, the mobile device may be configured to connect to a selected one of one or more candidate networks upon determining that the selected one meets the one or more service level requirements. In embodiments, the mobile device may be configured to choose from amongst a subset of the one or more candidate wireless networks that are determined to meet the one or more service level requirements to select the one determined to provide the best service. In embodiments, the mobile device may be configured to select a selected one of the candidate networks that may be best able to meet the service level requirements, even if none of the candidate wireless networks is determined to meet all service level requirements.

Figure 5:
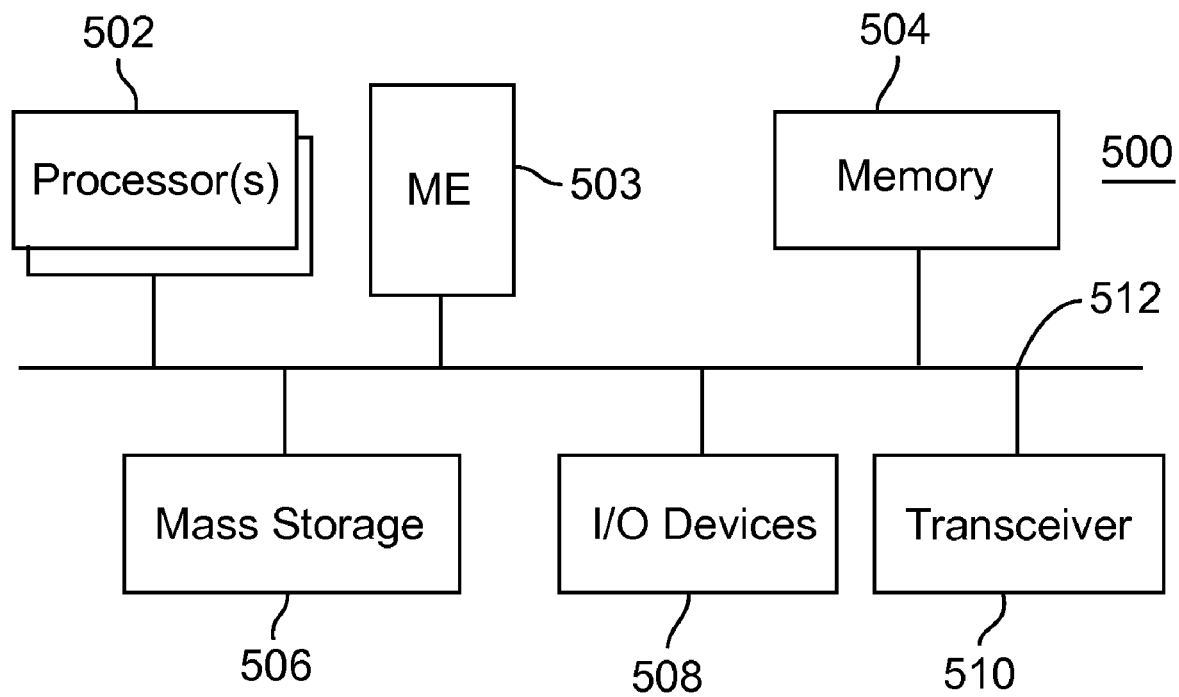
FIG. 5 illustrates a computing system suitable for practicing various embodiments.

FIG. 5 illustrates a computing system suitable for practicing various embodiments. As shown, computing system 500 includes one or more processors 502, manageability engine 503, and system memory 504. Additionally, computing system 500 includes mass storage devices 506 (such as a diskette drive, hard drive, CDROM and so forth), input/output devices 508 (such as keyboard, cursor control and so forth) and transceiver 510 (such as network interface cards, modems and so forth). The elements are coupled to each other via system bus 512, which represents one or more buses. In the case of multiple buses, they may be bridged by one or more bus bridges (not shown).

Each of these elements may perform its conventional functions known in the art. Also, one or more software modules (not shown) may be executed by processor(s) 502 to practice or contribute to the practice of the methods described herein to implement the network manager, information service, or mobile device as described throughout the specification. Such software modules may be placed into mass storage 506 of computing system 500. The placement may be made in the factory, or in the field, through, for example, a distribution medium (not shown), such as a compact disc (CD), Digital Versatile Disc (DVD), or through transceiver 510 (from a distribution server (not shown)). In embodiments, the distribution medium may be an article of manufacture having programming instructions configured to implement one or more aspects of one or more methods as disclosed herein. More specifically, the article of manufacture may comprise a computer readable storage medium having a plurality of programming instructions stored in the storage medium. The programming instructions may then be read or loaded into a computer system to practice or contribute to the practice of the methods described herein to implement the software module(s).

In various embodiments, computer system 500 may be a server, a desktop computer, a laptop computer, a tablet computer, or a smart phone. In other embodiments, computer system 500 may be embedded in a media player, a game console, a set-top box, diskless workstation, a digital recorder, or other device. Computer system 500 may be the network manager and/or information service according to embodiments previously described. Computer system may be a mobile device according to various embodiments previously described.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
determining, by a network manager system, at an initiation of the network manager system, that a mobile device currently communicatively coupled to a first wireless network of a plurality of wireless networks, should switch to another wireless network of the plurality of wireless networks;
obtaining, by the network manager system, from an information service system, service flow context information associated with a second wireless network of the plurality of wireless networks, wherein the information service system is not the second wireless network, remotely disposed from the network manager system, and accessible to the mobile device,
generating, by the network manager system, a message for the mobile device, the message instructing the mobile device to switch to the second wireless network, and including the service flow context information of the second wireless network; and
sending, by the network manager system, the message to the mobile device to instruct the mobile device to switch to the second wireless network, the included service flow context information enabling the mobile device to accept or refuse the instruction to switch, without having to access the information service system for the service flow context information associated with the second wireless network.

2. The method of claim 1, wherein determining comprises determining, by the network manager system, based on network management parameters.

3. The method of claim 1 further comprising receiving, by the network management system, from the mobile device, a refusal message indicating refusal of the mobile device to connect to the second wireless network due to the mobile device concluding, based on the service flow context information in the message, that the second wireless network is able to meet one or more service level requirements of the mobile device.

4. The method of claim 1, wherein the service flow context information includes one or more of an available Quality of Service (QoS), an available throughput, an available bandwidth, delay information of the plurality of candidate wireless networks, or jitter information of the second wireless network.

5. The method of claim 1, wherein the plurality of wireless networks include a plurality of types of wireless networks.

6. The method of claim 1, wherein the service flow context information includes attributes of the second wireless network that are of potential interest to the mobile device in determining, by the mobile device, whether the second wireless network is able to meet one or more service level requirements of the mobile device.

7. An apparatus comprising:
one or more transceivers configured to transmit and receive data or messages; and
a processor coupled to the one or more transceivers; and
programming instructions configured to be executed by the processor to cause the apparatus to:
determine, at an initiation of the apparatus, whether a mobile device communicatively coupled to a first wireless network of a plurality of wireless networks is to be instructed to switch to another one of the plurality of wireless networks;
obtain attributes of a second wireless network of the plurality of wireless networks from a information service system that is not the second wireless network, remotely disposed from the apparatus, and accessible to the mobile device; and
integrally instruct the mobile device to switch to the second wireless network, with the attributes of the second wireless network to enable the mobile device to determine whether to accept or refuse the instruction to switch to the second wireless network, without having to access the information service system for the attributes associated with the second wireless network.

8. The apparatus of claim 7 wherein the programming instructions are further configured to be executed by the processor to cause the apparatus to periodically obtain the attributes of the plurality of wireless networks from the information service system.

9. The apparatus of claim 7 wherein the programming instructions are further configured to be executed by the processor to cause the apparatus to obtain the attributes of the plurality of wireless networks in real time, after determining to instruct the mobile device to switch.

10. An apparatus comprising:
one or more radios configured to transmit and receive modulated wireless signals; and
a processor coupled to the one or more radios; and
programming instructions configured to be executed by the processor to cause the apparatus to:
receive, from a network manager system, via the one or more radios, a message instructing the apparatus to switching from connecting to a first wireless network of a plurality of wireless networks, to connect to a second wireless network of the plurality of wireless networks, the message including service flow context information of the second wireless network obtained by the network manager system from an information service system that is not the second wireless network, remotely disposed from the network manager system, and accessible to the apparatus;
determine, based on the received service flow context information, whether the second wireless network is able to meet one or more service level requirements of the apparatus; and
accept or refuse the message instruction to switch to the second wireless network, based at least in part on a result of the determination.

11. The apparatus of claim 10 wherein the programming instructions are further configured to be operated by the processor to cause the apparatus to connect to the second wireless network, via the one or more radios, on determining to accept the message instruction to switch.

12. The apparatus of claim 10 wherein the processor is disposed on a chipset.

13. The apparatus of claim 10, wherein the apparatus comprises one of a portable computing device, a personal digital assistant, a mobile phone, a game player, a media player, ultra mobile portable computer (UMPC), Mobile Internet Device (MID), or a desktop computer.

* * * * *